US012811944B2

(12) United States Patent
Ben Dov et al.

(10) Patent No.: US 12,811,944 B2
(45) Date of Patent: Nov. 24, 2026

(54) DETECTION OF FRAUDULENT USER ACCESS BASED ON CONTEXT ANALYSIS

(71) Applicants: Jonathan Ben Dov, Tel Aviv (IL); Avichai Ben David, Herzliya (IL); Elnatan Refael Revital, Jerusalem (IL); Polina Lutsker, Petah Tikva (IL)

(72) Inventors: Jonathan Ben Dov, Tel Aviv (IL); Avichai Ben David, Herzliya (IL); Elnatan Refael Revital, Jerusalem (IL); Polina Lutsker, Petah Tikva (IL)

( * ) Notice: Subject to any disclaimer, the term of this patent is extended or adjusted under 35 U.S.C. 154(b) by 195 days.

(21) Appl. No.: 18/222,512

(22) Filed: Jul. 17, 2023

(65) Prior Publication Data

US 2025/0030694 A1 Jan. 23, 2025

(51) Int. Cl.

*H04L 9/40* (2022.01)
*G06F 21/55* (2013.01)
*G06F 21/62* (2013.01)

(52) U.S. Cl.

CPC .......... *H04L 63/102* (2013.01); *G06F 21/552* (2013.01); *G06F 21/554* (2013.01); *G06F 21/6218* (2013.01); *H04L 63/1425* (2013.01); *H04L 63/1441* (2013.01); *H04L 63/105* (2013.01)

(58) Field of Classification Search

CPC ............... H04L 63/102; H04L 63/1425; H04L 63/1441; H04L 63/105; G06F 21/552; G06F 21/554; G06F 21/6218

See application file for complete search history.

(56) References Cited

U.S. PATENT DOCUMENTS

| | | | | |
|---|---|---|---|---|
| 10,467,394 | B2 | 11/2019 | Asulin et al. | |
| 10,771,969 | B2 | 9/2020 | Ellison | |
| 10,834,590 | B2 | 11/2020 | Turgeman et al. | |
| 2018/0293377 | A1* | 10/2018 | Tomonaga ............ | G06F 21/552 |
| 2019/0197236 | A1* | 6/2019 | Niculescu-Mizil ... | G06F 21/554 |
| 2020/0380119 | A1* | 12/2020 | Correa Bahnsen ... | G06F 21/566 |
| 2021/0160247 | A1* | 5/2021 | Gaddam ............... | H04L 63/102 |

(Continued)

OTHER PUBLICATIONS

Lei Ma, Chungang Yan, Peihai Zhao and M. Wang, "A kind of mouse behavior authentication method on dynamic soft keyboard," 2016 IEEE International Conference on Systems, Man, and Cybernetics (SMC), Budapest, 2016, pp. 000211-000216, doi: 10.1109/SMC.2016.7844243. (Year: 2016).*

*Primary Examiner* — Robert B Leung

(57) ABSTRACT

A method of detecting potential fraudulent privileged user accesses, comprising collecting a plurality of access attributes identified during each of one or more privileged accesses conducted by one or more users using one or more client devices, creating a feature vector for the each privileged access by a restive user based on a combination of at least some of the plurality of access attributes, computing, in real-time, an access score indicative of deviation of the feature vector from one or more typical feature vectors created for the respective user based on a plurality of previous privileged accesses conducted by the respective user, and initiating one or more fraudulent access mitigation actions responsive to determining that the access score exceeds a certain threshold indicative of potential fraudulent privileged accesses. The access attributes relate to location of users, client devices, network environment, and interaction patterns of the users with their client devices.

20 Claims, 2 Drawing Sheets

(56) References Cited

U.S. PATENT DOCUMENTS

| | | | | |
|---|---|---|---|---|
| 2023/0134546 | A1* | 5/2023 | Gopalakrishnan | G06N 20/20<br>726/23 |
| 2023/0244766 | A1* | 8/2023 | Erramilli | G06F 21/316<br>726/17 |
| 2023/0262072 | A1* | 8/2023 | Cambric | G06N 3/08<br>726/22 |
| 2023/0283628 | A1* | 9/2023 | Johnston | H04L 41/16<br>726/22 |
| 2023/0308460 | A1* | 9/2023 | Thomas | H04L 63/102 |
| 2023/0344842 | A1* | 10/2023 | Akhtar | H04L 63/1425 |
| 2024/0427862 | A1* | 12/2024 | Agrawal | G06F 21/316 |

* cited by examiner

DETECTION OF FRAUDULENT USER ACCESS BASED ON CONTEXT ANALYSIS

BACKGROUND

The present invention, in some embodiments thereof, relates to detecting potential fraudulent privileged access, and, more specifically, but not exclusively, to detecting potential fraudulent privileged access based on analysis of multiple context attributes identified for the privileged access.

Access to secure resources, for example, user accounts, secure devices, online services, transactions (assets, data, etc.), and/or the like are typically subject to user authentication to ensure security, privacy, and/or safety and users are therefore required to conduct privileged accesses in which they have to authenticate themselves in order to gain access to the secure resources.

Vast efforts, resources, and expertise are invested by malicious parties in attempts to impersonate as valid, legitimate users, who are authorized to access the secure resources, in attempt to gain access to the secure resources and compromise them, for example, gain control over them, retrieve data and/or assets from them, and/or the like Reliable user authentication may be therefore a major concern for protecting such secure resources, for example, private devices (e.g., mobile device, laptop, etc.), financial services (e.g. online banking services, cryptocurrency accounts, etc.), remote access applications, entertainment streaming services, social networks and/or the like.

SUMMARY

It is an object of the present invention to provide methods, systems and software program products for detecting potential fraudulent privileged conducted by malicious partiers impersonating as legitimate users in attempt to compromise privileged resources and initiating mitigation actions accordingly. The foregoing and other objects are achieved by the features of the independent claims. Further implementation forms are apparent from the dependent claims, the description and the figures.

According to a first aspect of the present invention there is provided a method of detecting potential fraudulent privileged user accesses, comprising using one or more processors configured for:

- Collecting a plurality of access attributes identified during each of one or more privileged accesses conducted by one or more users using one or more client devices. The plurality of access attributes relate to at least some of: a location of the one or more users, the one or more client devices, a network environment, and interaction of the one or more users with one or more user input interfaces of the one or more client devices.
- Creating a feature vector for each of the one or more privileged accesses based on a combination of at least some of the plurality of access attributes;
- Computing, in real-time, an access score indicative of deviation of the feature vector from one or more typical feature vectors created for the one or more users based on a plurality of previous privileged accesses conducted by the one or more users.
- Initiating one or more fraudulent access mitigation actions responsive to determining that the access score exceeds a certain threshold indicative of potential fraudulent privileged accesses.

According to a first aspect of the present invention there is provided a system for detecting potential fraudulent privileged user accesses, comprising a program store storing a code, and one or more processors coupled to the program store for executing the stored code. The code comprising:

- Code instructions to collect a plurality of access attributes identified during each of one or more privileged accesses conducted by one or more users using one or more client devices. The plurality of access attributes relate to at least some of: a location of the one or more users, the one or more client devices, a network environment, and interaction of the one or more users with one or more user input interfaces of the one or more client devices.
- Code instructions to create a feature vector for each of the one or more privileged accesses based on a combination of at least some of the plurality of access attributes.
- Code instructions to compute, in real-time, an access score indicative of deviation of the feature vector from one or more typical feature vectors created for the one or more users based on a plurality of previous privileged accesses conducted by the one or more users.
- Code instructions to initiate one or more fraudulent access mitigation actions responsive to determining that the access score exceeds a certain threshold indicative of potential fraudulent privileged accesses.

In a further implementation form of the first and/or second aspects, the one or more privileged accesses are subject to user authentication. The one or more privileged accesses relates to one or more members of a group comprising: a login to an account, a login to a device, a login to a secure service, a transaction, and/or an account creation.

In a further implementation form of the first and/or second aspects, the access score is computed by applying one or more trained Machine Learning (ML) models to the feature vector. The one or more ML models are trained to learn one or more typical access patterns for the one or more users based on a plurality of training feature vectors created based on a plurality of access attributes collected during a respective one of the plurality of previous privileged accesses.

In a further implementation form of the first and/or second aspects, the one or more ML models are configured to apply dimension reduction and dimension reconstruction to the feature vectors.

In a further implementation form of the first and/or second aspects, the access score is computed for the one or more privileged accesses based on a reconstruction error of the one or more ML models applied to the feature vector of the one or more privileged accesses.

In an optional implementation form of the first and/or second aspects, the certain threshold is adjusted to reduce false positive detection of privileged accesses potentially conducted by one or more fraudulent parties emulating privileged accesses of the one or more users.

In a further implementation form of the first and/or second aspects, at least some of the plurality of access attributes relating to interaction of the one or more users with the one or more user input interfaces comprise a plurality of movement parameters of one or more pointing devices used by the one or more users during the one or more privileged accesses.

In a further implementation form of the first and/or second aspects, the movement parameters of the one or more pointing devices are expressed by one or more log-normal cumulative Distribution Functions (CDF) indicative of one or more movement patterns of the one or more pointing devices.

In a further implementation form of the first and/or second aspects, the access attributes relating to interaction of the one or more users with the one or more user input interfaces comprise one or more stroke parameters captured for one or more keyboard devices used by the one or more users during the one or more privileged accesses.

In a further implementation form of the first and/or second aspects, the access attributes relating to interaction of the user with the one or more user input interfaces comprise one or more voice and/o speech attributes of the one or more users captured for one or more audio input devices used by the one or more users during the one or more privileged accesses.

In a further implementation form of the first and/or second aspects, the access attributes relating to interaction of the one or more users with the one or more user input interfaces comprise one or more tactile attributes of the one or more users captured for one or more tactile input devices used by the one or more users during the one or more privileged accesses.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
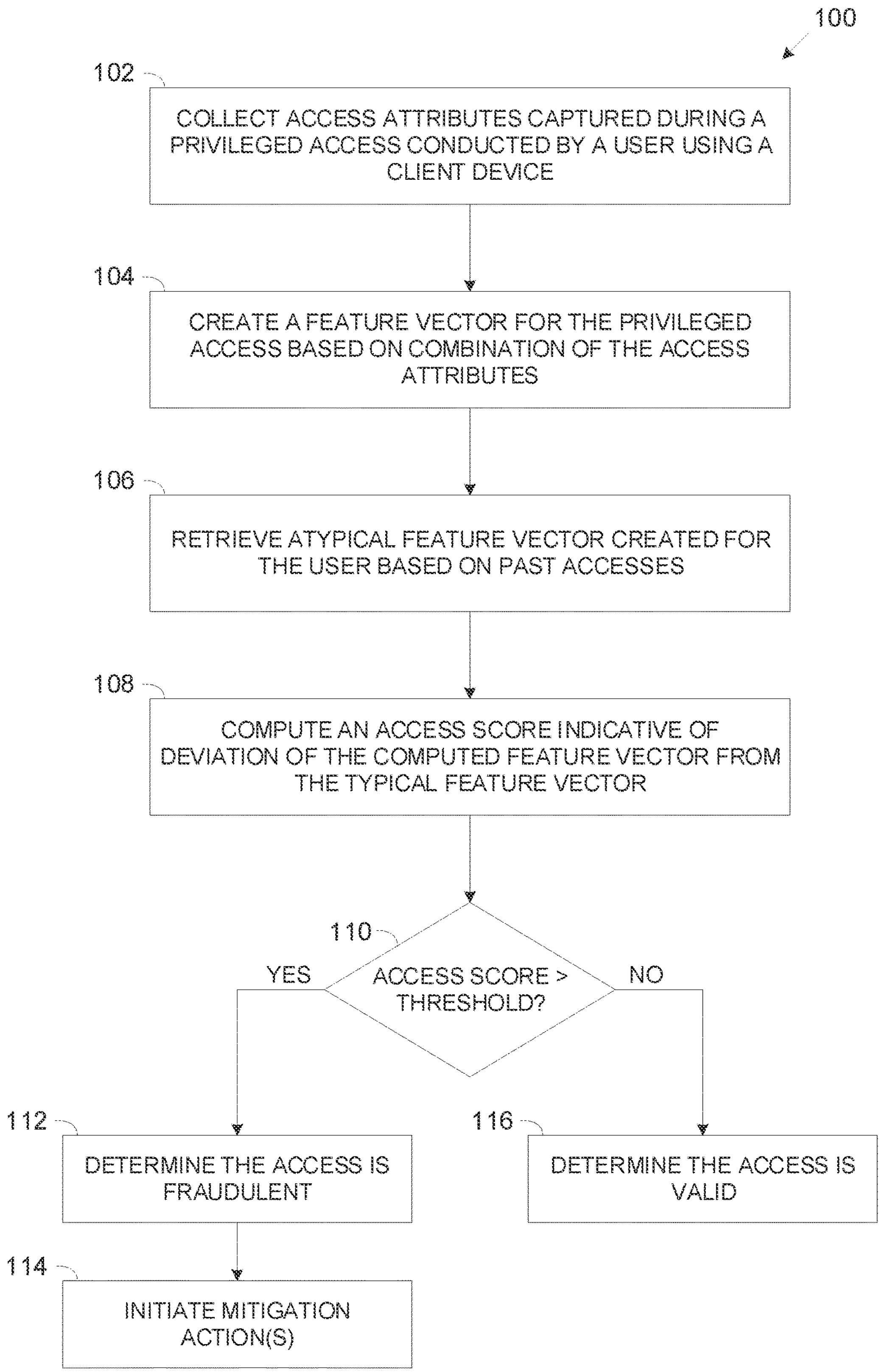
FIG. 1 is a flowchart of an exemplary process of detecting potential fraudulent privileged accesses conducted for accessing secure resources based on contextual access attributes identified during the access, according to some embodiments of the present invention.

The present invention, in some embodiments thereof, relates to detecting potential fraudulent privileged access, and, more specifically, but not exclusively, to detecting potential fraudulent privileged access based on analysis of multiple context attributes identified for the privileged access.

According to some embodiments of the present invention, there are provided methods, systems, devices and computer software programs for detecting potential fraudulent privileged accesses conducted by users using respective client devices, for example, a smartphone, a tablet, a smart watch, a desktop, a laptop, a proprietary client device and/or the like for accessing secure resources for example, user accounts, devices, secure services, transactions (e.g., transaction of financial assets, etc.), and/or the like.

Each privileged access initiated by the users may be evaluated based on contextual access attributes identified during the respective access to estimate, predict, and/or determine whether the respective privileged access is valid, i.e., conducted by a legitimate, authentic and/or authorized user accessing a secure resource or a potential fraudulent access conducted by a malicious party, human and/or automated bot, in attempt to compromise the secure resource, for example, gain control over the secure resource, control and/or retrieve data and/or assets of the secure resource, and/or the like.

The access attributes collected and/or identified for each privileged access may relate to one or more aspects of the access, for example, a location of the user (e.g., geolocation, site, etc.), a timing of the access, the client device, a network environment, interaction of the user with the client device (e.g., mouse, keyboard, tactile interface, etc.), and/or the like.

In particular, one or more typical privileged access patterns, which may be expressed by respective feature vectors, may be created for each user based on historical data, specifically a plurality of previous valid privileged accesses to one or more secure resources.

During each privileged access conducted by a respective user, an access pattern, which may be reflected by a respective access feature vector, may be created for the respective privileged access based on at least some of the plurality of access attributes identified during the respective privileged access.

The respective privileged access may be then evaluated to estimate whether it is valid or potentially fraudulent based on a deviation of the feature vector created for the respective privileged access from the typical feature vector(s) created for the previous valid privileged accesses. In case the privileged access is estimated to be potentially fraudulent, one or more actions may be initiated, for example, further investigate the access, block access to the secure resource, and/or the like.

Estimating and/or determining whether each privileged access is valid or potentially fraudulent may be done by computing an access score for the privileged access based on its feature vector and compare the access score to a threshold indicative of potential fraudulent privileged accesses.

Optionally, one or more trained Machine Learning (ML) models may be applied to estimate, predict, and/or determine whether a privileged access is valid or potentially fraudulent. The ML model(s), for example, a neural network, a classifier, a Support Vector Machine (SVM), and/or the like may be trained to learn typical patterns of privileged accesses conducted by each user using a plurality of feature vectors created based on the historical data collected for the respective user during a plurality of previous valid privileged accesses to one or more secure resources. The trained ML model(s) may be then deployed to estimate a deviation of one or more privileged accesses conducted by the respective user from the typical privileged access patterns learned for the respective user.

Determining potential fraudulent privileged accesses to secure resources based on a plurality of access attributes recorded during each access may present major benefits and advantages over currently existing methods and systems for fraudulent access detection.

First, analyzing the access attributes, in particular a combination of multiple access attributes identified for a privileged access conducted by a specific user and evaluating accordingly whether the privileged access is valid of potentially fraudulent compared to typical access patterns established for the specific user may significantly increase detection performance of fraudulent accesses, for example, accuracy, reliability, consistency, and/or the like. This is since it may be highly difficult if not impossible to imitate a combination of a large number of attributes typical to a specific user in attempt to impersonate as the user and deviating, even slightly, from several access attributes typical to the specific user may be highly indicative of a fraudulent access.

Moreover, the combination of access attributes may provide, and/or reveal an extensive context of each privileged access which may be analyzed to accurately, robustly, and consistently detect potential fraudulent accesses which deviate from patterns identified and/or learned for each specific user.

Furthermore, the threshold defined for estimating whether a privileged access is valid or potentially fraudulent may be adjusted, for example, during training of the ML model(s), to reduce and potentially prevent false positive detection of the fraudulent access as valid accesses.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process of detecting potential fraudulent privileged accesses conducted for accessing secure resources based on contextual access attributes identified during the access, according to some embodiments of the present invention.

An exemplary process 100 may be executed to identify one or more fraudulent accesses conducted for accessing one or more resources. In particular, the process 100 may be executed to identify fraudulent accesses to one or more secure resources associated with one or more users, for example, an account, a device, a secure service, a transaction, and/or the like. Accesses to such secure resources are typically privileged accesses which are subject to user authentication before the user is granted access.

The privileged accesses may be evaluated to determine and/or detect whether they are initiated by legitimate users or by one or more malicious parties impersonating as legitimate users in attempt to compromise the secure resources, for example, gain control over one or more secure resources, access private, sensitive, and/or confidential data stored by one or more secure resources, and/or the like. The malicious parties may comprise human Evaluating, determining and/or detecting potential fraudulent accesses may be done based on analysis of a plurality of access attributes identified during each privileged access. These access attributes may relate to one or more aspects of the access, for example, a location of the user, a timing of the access, the client device, a network environment, interaction of the user with the client device and/or the like.

Analysis of the access attributes, in particular analysis of a combination of multiple access attributes identified for a privileged access may provide a context of the privileged access which in turn may be evaluated to determine whether the respective access is legitimate of potentially fraudulent and should be thus further investigated.

Figure 2:
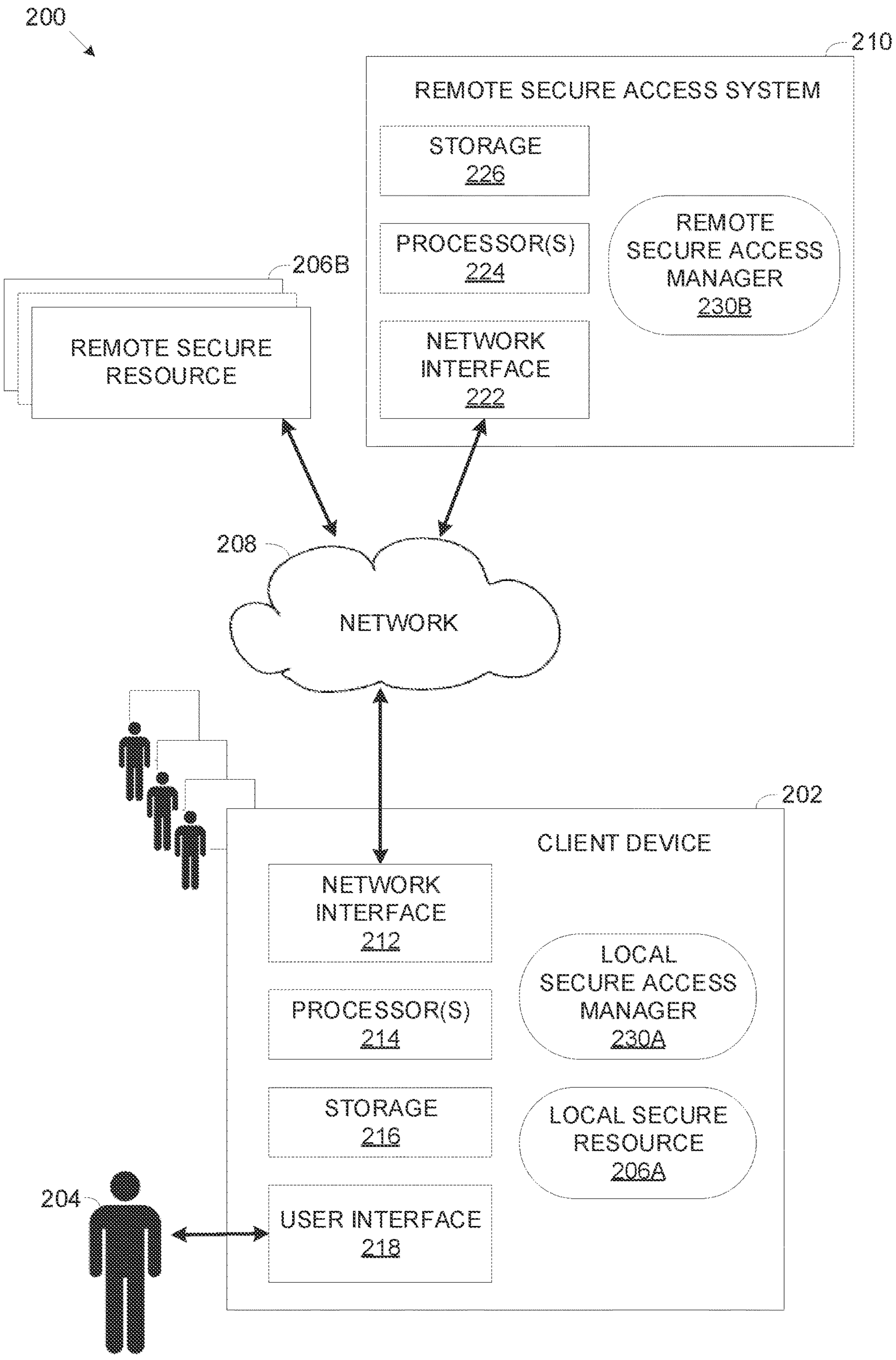
FIG. 2 is a schematic illustration of an exemplary system for detecting potential fraudulent privileged accesses conducted for accessing secure resources based on contextual access attributes identified during the access, according to some embodiments of the present invention.

Reference is also made to FIG. 2, which is a schematic illustration of an exemplary system for detecting potential fraudulent privileged accesses conducted for accessing secure resources based on contextual access attributes identified during the access, according to some embodiments of the present invention.

In an exemplary system 200, one or more users 202 may each use one or more client devices 202, for example, a Smartphone, a tablet, a smart watch, a desktop, a laptop, a proprietary client device and/or the like to access one or more secure resources 206 which require privileged access, i.e., users 202 must be first authenticated before granted access to a secure resource 206.

As described herein before, the privileged accesses to the secure resource 206 associated with users 204 may comprise a login to an account, creation of an account, access to a device, access to a secure service, a transaction and/or the like.

The secure resources 206 may include, for example, one or more local secure resources 206A at the client device 202, for example, a resource, a device, a service, and/or the like. In such case, one or more privileged accesses initiated by the user 204 may comprise, for example, a login to the client device 202 (e.g. secure login) and/or to a device associated with the client device, for example, an attached and/or paired device (e.g., storage device, multimedia device, etc.), and/or the like. In another example, privileged accesses to local secure resources 206A may comprise accessing one or more secure services, applications and/or tools executed by the client device 202, for example, a login to a local account maintained at the client device 202, for example, an Operating System (OS), accessing a secure application, accessing a private folder, and/or the like.

In another example, the secure resources 206 may include one or more remote secure resources 206B accessible to the client device 202 via a network 206, for example, a secure service, a secure system, a secure platform, a remote access system, and/or the like. In such case, one or more privileged accesses initiated by the user 204 may comprise, for example, a login to a remote server, creating an account in a remote storage device, and/or the like. In another example, privileged accesses to remote secure resources 206B may comprise a login to an online service, for example, a financial service (e.g., banking account, cryptocurrency account, credit card account, etc.), an office remote access application (e.g., remote desktop, etc.), a social network, a media service (e.g., streaming service, music channel, etc.), and/or the like.

The network 206 through which one or more of the client devices 202 may communicate with the remote secure resource(s) 206B may include one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

The secure resource(s) 206, either local secure resources 206A and/or remote secure resources 206B may be associated with a secure access system configured to analyze privileged accesses to the secure resource(s) 206 in attempt to identify potential fraudulent accesses initiated by malicious parties impersonating as one or more legitimate users 204 in attempt to compromise one or more of the secure resources 206.

The secure access system may be deployed locally in one or more client devices 202 such that the respective client device 202 may monitor, analyze and/or evaluate privileged accesses conducted by the associated users 204 to access one or more secure resources 204. In such case, the secure access system may monitor privileged accesses either to one or more local secure resources 206B and/or to one or more remote secure resources 206B in order to identify potential fraudulent accesses.

Optionally, monitoring, analyzing and/or evaluating privileged accesses and/or part thereof may be conducted by a remote secure access system 210. For example, one or more client devices 202 may execute a local application, for example, a web browser, a local agent, an access utility and/or the like for accessing one or more secure resources 206, specifically remote secure resources 206B via the network 208. In such case, the remote secure access system 210 may monitor privileged accesses made by a client device 202 to one or more remote secure resources 206B in order to identify potential fraudulent accesses. In another example, one or more client devices 202 may communicate with the remote secure access system 210 via the network 208 to provide the remote secure access system 210 access information and attributes identified during an access to one or more local secure resources 206A. Based on analysis of the received access attributes, the remote secure access system 210 may identify potential fraudulent accesses to one or more of the local secure resources 206A.

The client device 202 may comprise a network interface 212, a processor(s) 214 for executing the process 100 and/or part thereof to identify potential fraudulent accesses, a storage 216 for storing data and/or code (program store) and a user interface 218 for interacting with the user 204.

The network interface 212 may comprise one or more wired and/or wireless network adaptors for connecting to the network 208.

The processor(s) 214, homogenous or heterogeneous, may include one or more processing nodes arranged for parallel processing, as clusters and/or as one or more multi core processor(s). The storage 216 may include one or more non-transitory memory devices, either persistent non-volatile devices, for example, a ROM, a Flash array, a hard drive, and/or the like as well as one or more volatile devices, for example, a RAM device, a cache memory and/or the like.

The processor(s) 214 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 216 and executed by one or more processors such as the processor(s) 214.

Optionally, the processor(s) 214 may include, utilize and/or apply one or more hardware elements available in the slipperiness evaluation system 200, for example, a circuit, a component, an Integrated Circuit (IC), an Application Specific IC (ASIC), a Field Programmable Gate Array (FPGA), a Digital Signals Processor (DSP), a Graphic Processing Unit (GPU), an Artificial Intelligence (AI) accelerator, and/or the like.

The processor(s) 214 may therefore execute one or more functional modules utilized by one or more software modules, one or more of the hardware modules and/or a combination thereof. For example, the processor(s) 214 may execute a secure access manager 230, in particular a local secure access manager 230A configured to execute the process 100 and/or part thereof for identifying potential fraudulent accesses to one or more secure resources 206. It should be noted, that the process 100 and/or part thereof executed by local secure access manager 230A may be executed by any of one or more processors of the processor (s) 212 such that any one of the processors of the processor (s) 212 may execute the process 100 and/or part thereof or optionally not participate in execution of the process 100.

The user interface 218 may include one or more user interfaces, i.e. Human Machine Interfaces (HMI) for interacting with the user 204, for example, a keyboard, a mouse, a touchscreen, a touchpad, a pointing device, a display, a speaker, an earphone, a microphone, a tactile interface (e.g., fingerprint reader, etc.), and/or the like.

The user interface 218 may optionally include one or more biometric sensors and/or devices, for example, an imaging sensor (e.g., camera, infrared sensor, video camera, etc.) for iris and/or face recognition, a microphone for voice and/or speech recognition and/or the like.

The remote secure access system 210 may comprise a network interface 222 such as the network interface 212, a processor(s) 224 such as the processor(s) 214 for executing the process 100 and/or part thereof to identify potential fraudulent accesses, and a storage 226 for storing data and/or code (program store).

The network interface 222 may include one or more wired and/or wireless network interfaces for connecting to the network 208 to provide the remote secure access system 210 network access for communicating with one or more of the client devices 202, and/or with one or more of the remote secure resources(s) 206B.

The processor(s) 224, homogenous or heterogeneous, may include one or more processing nodes arranged for parallel processing, as clusters and/or as one or more multi core processor(s). The storage 226 may include one or more non-transitory persistent storage devices, for example, a ROM, a Flash array, a hard drive and/or the like. The storage 226 may also include one or more volatile devices, for example, a RAM component, a cache and/or the like. The storage 226 may further comprise one or more network storage devices, for example, a storage server, a Network Accessible Storage (NAS), a network drive and/or the like accessible through the network interface 222.

The processor(s) 224 may execute one or more software modules each comprising a plurality of program instructions stored in a non-transitory medium (program store) such as the storage 226 and executed by one or more processors such as the processor(s) 224. Optionally, the processor(s) 224 may include, utilize and/or apply one or more hardware elements available in the slipperiness evaluation system 200, for example, a circuit, a component, an IC, an ASIC, an FPGA, a DSP, a GPU, an AI accelerator, and/or the like.

The processor(s) 224 may therefore execute one or more functional modules utilized by one or more software modules, one or more of the hardware modules and/or a combination thereof. For example, the processor(s) 224 may execute a remote secure access manager 230B configured to execute the process 100 and/or part thereof for identifying potential fraudulent accesses to one or more secure resources 206. It should be noted, that the process 100 and/or part thereof executed by remote secure access manager 230B may be executed by any of one or more processors of the processor(s) 222 such that any one of the processors of the processor(s) 222 may execute the process 100 and/or part thereof or optionally not participate in execution of the process 100.

Optionally, the remote secure access system 210 may be integrated with one or more of the remote secure resources 206B.

Optionally, the remote secure access system 210, specifically, the remote secure access manager 230B may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like that may communicate with the pool equipment unit 202 via one or more networks to receive the captured sensory data and for generating the map of the water pool 204.

As describe herein before, the process 100 may be executed by the local secure access manager 230A, by the remote secure access manager 230B and/or by a combination thereof, i.e., distributed between the secure access manager 230A and the remote secure access manager 230B. In case the process 100 is conducted at least partially by the remote secure access manager 230B, the remote secure access manager 230B may communicate with a local application executed by the client device 202, for example, the local secure access manager 230A to receive information, data and/or attributes relating to privileged access to secure resource(s) 206 in order to monitor these privileged accesses and identify potential fraudulent accesses. For brevity, the process 100 is described to be executed by a secure access manager 230 which may comprise the local secure access manager 230A, the remote secure access manager 230B and/or by a combination thereof.

Moreover, the process 100 is described for a single access initiated by a single user 204 using a single associated client device 202 to a single secure resource 206. This, however, should not be construed as limiting since, as may be apparent to a person skilled in the art, the process 100 may be duplicated, expanded, and/or scaled for a plurality of accesses conducted by a plurality of users 204 each using one or more client devices 202 for accessing one or more of the secure resources 206.

As shown at 102, the process 100 starts with the secure access manager 230 receiving, fetching, and/or otherwise collecting a plurality of access attributes identified, for example, captured, detected and/or the like during a privileged access conducted by a user 204 using a client device 202.

The privileged access which is subject to user authentication may be initiated and/or conducted by the user 204 for accessing a secure resource 206 which may be a local secure resources 206A and/or a remote secure resources 206B. Since it may relate to one or more secure resources 206, each privileged access may comprise one or more accesses of which at least some may require successful authentication of the user 204 before granting him access to the respective secure resource 206.

The privileged access may include, for example, a login to a device, for example, the client device 202 which may be locked and accessed only after the user 204 is successfully authenticated via one or more authentication measures, for example, password, code, key, biometric signature (e.g., fingerprint, iris, face, voice, etc.), a security fob (key), and/or the like. In another example, the privileged access may include, for example, a login to one or more devices associated with the client device 202, for example, a paired device (e.g., multimedia device, headphone, earphone, etc.), an attached device (e.g., storage device, etc.), a connected device (e.g., another client device 202, etc.) and/or the like.

In another example, the privileged access may include a login to an account of the user 204, specifically a secure account 206 which is protected (secured) and requires the user 204 to successfully authenticate (e.g., password, biometric, two-factor, etc.) before granted access to the secure account 206. Such accounts may include, for example, a banking account, a cryptocurrency account, a credit card account, an OS, an application, and/or the like.

In another example, the privileged access may include a login to a secure service 206, in particular, an online secure service 206 in which the user 204 has to successfully authenticate before granted access to the secure service 206. Such secure service 206, may include, for example, a healthcare service, an office remote access application (e.g., remote desktop, etc.), a social network, a media distribution service (e.g., streaming service, music channel, etc.), and/or the like.

Moreover, the privileged access may include an account creation of an account, specifically a secure account 206 by the user 204, for example, the banking account, the cryptocurrency account, the credit card account, the OS account, and/or the like. In another example, the privileged access may be initiated to create a secure account 206 at a secure service 206, for example, the healthcare service, the remote access application, the social network, the media distribution service and/or the like.

In another example, the privileged access may relate to a transaction conducted by the user 204, for example, financial transaction, cryptocurrency transaction, transaction of a digital asset (e.g., Non-fungible token (NFT), etc.), and/or the like which may be subject to authentication of the user 204.

The plurality of access attributes collected during the privileged access may reflect and/or express a plurality of different aspects of the privileged access and may therefore provide an extensive context of the privileged access.

For example, one or more of the access attributes may relate to a location of the user 204, for example, a geolocation of the client device 202 and hence of the user 204 using the client divide 202. The geolocation may be received, for example, from one or more geolocation sensors associated with the client device 202, for example, a Global Positioning System (GPS) sensor, and/or the like. In another example, the access attributes may relating to the location of the user 204 may comprise a site in which the user 204 is located while initiating the privileged access, for example, home, office, city, and/or the like.

In another example, one or more of the access attributes may relate to timing of the privileged access, for example, a time of day, a day of week, a date, and/or the like.

In another example, one or more of the access attributes may relate to the client device 202, for example, a type (e.g., desktop, laptop, mobile device, etc.), a brand (manufacturer), a model, a serial number, a Media Access Control (MAC) address, an OS, an OS version, installed applications and optionally their versions, and/or the like.

In another example, one or more of the access attributes may relate to a network environment of the client device 202. For example, the access attributes may include an address and/or identifier assigned to the client device 202 in the network it is currently connected to, for example, an Autonomous System Numbers (ASN), an Internet Protocol (IP) address, and/or the like. In another example, the access attributes may include an address and/or identifier of one or more network equipment units connecting the client device 202 to the network, for example, a router, a switch, a gateway, a service provider, and/or the like.

In another example, one or more of the access attributes may relate to interaction of the user 204 with one or more user input interfaces of the client device 202 which are available through the user interface 218. In particular, the access attributes may relate to interaction made by the user 204 with the user input interface(s) during the privileged access. Such access attributes relating to interaction of the user 204 with the client device 202 may characterize the interaction typical to the specific user 204 which may be significantly unique compared to other users and thus significantly distinguish the user 204 from other users.

For example, one or more of the access attributes relating to interaction of the user 204 with the user input interface(s) may comprise a plurality of movement parameters captured for one or more pointing devices used by the user 204 during the privileged access which may be typical to and thus highly indicative of the user 204. The movement parameters may include, for example, a mouse, a touchscreen, a touchpad, a trackball, and/or the like. The movement parameters of the pointing device may express, for example, start acceleration, maximum acceleration, velocity, curvature, sharp angles between moves, stability, and/or the like.

Optionally, the secure access manager 230 may further manipulate, and/or process one or more of the movement parameters to produce one or more movement patterns for the pointing device(s) used by the user 204 during the privileged access. For example, the secure access manager 230 may compute a mean, a standard deviation, a count, and/or the like for one or more of the movement parameters recorded for the pointing device, for example, mouse. In another example, based on one or more of the movement parameters and/or their manipulation, the secure access manager 230 may create one or more log-normal Cumulative Distribution Function (CDF) indicative of one or more movement patterns of one or more of the pointing devices used by the user 204, for example, mouse move activity.

In another example, one or more of the access attributes relating to interaction of the user 204 with the user input interface(s) may comprise one or more stroke parameters captured for one or more keyboard devices used by the user 204 during the privileged access which may be typical to and thus highly indicative of the user 204. The stroke parameters captured for one or more keyboard devices, for example, a keyboard, a touchscreen, and/or the like may express, for example, typing speed, pressing force and/or pressure, and/or the like.

In another example, one or more of the access attributes relating to interaction of the user 204 with the user input interface(s) may comprise one or more voice and/or speech attributes of the user 204 captured via one or more audio input devices (e.g., microphone, etc.) of the client device 202 used by the user 204 during the privileged access. The voice and/or speech attributes which may be typical to and thus highly indicative of the user 204 may include, for example, a voice signature of the user 204, a spectrum, a frequency, a tone, an intonation, a diction, and/or the like.

In another example, one or more of the access attributes relating to interaction of the user 204 with the user input interface(s) may comprise one or more voice and/or speech attributes of the user 204 captured via one or more audio input devices (e.g., microphone, etc.) used by the user 204 during the privileged access. The voice and/or speech attributes which may be typical to and thus highly indicative of the user 204 may include, for example, a voice signature of the user 204, a spectrum, an intonation, a diction, and/or the like. The voice and/or speech attributes may be directly extracted from the voice and/or speech of the user 204 as captured by the audio input device(s) and/or derived from analysis of the his voice and/or speech.

In another example, one or more of the access attributes relating to interaction of the user 204 with the user input interface(s) may comprise one or more tactile attributes captured for one or more tactile input devices of the client device 202 (e.g., touchpad, fingerprint reader, etc.) used by the user 204 during the privileged access. The tactile attributes which may be typical to and thus highly indicative of the user 204 may include, for example, a biometric signature of the user 204, a skin texture of a finger of the user 204, and/or the like.

The access attributes relating to interaction of the user 204 with the user input interfaces of the client device 202 movement parameters may relate to one or more user input interfaces used by the user 204 for actually initiating and/or conducting the privileged access. For example, the access attributes may comprise movement parameters of a mouse used by the user 204 to move a cursor and/or a pointer to one or more certain locations, areas, text fields and/or the like in screen, page, and/or Graphic User Interface (GUI) presented to the user 204 via one or more output user interfaces of the user interface 218, for example, a screen. In another example, the access attributes may comprise stoke parameters captured for a keyboard used by the user 204 to type text, for example, user name, password, and/or the like for accessing the secure resource 206.

However, one or more of the movement parameters may relate to pointing device(s) which are used by the user 204 during the privileged access but not directly for actually initiating and/or conducting the privileged access, for example, interacting with the client device 202 with respect to one or more other applications, tasks, and/or activities. For example, during a two-factor authentication privileged access, while waiting for a code transmitted from a remote authentication server to arrive the client device 202, movement parameters may be collected for one or more of the pointing devices used by the user 204 to interact with one or more other applications, tasks, and/or activities executed by the client device 202.

As shown at 104, the secure access manager 230 may create, in real-time (i.e., during the privileged access), a feature vector for the privileged access based on a combination of at least some of the plurality of access attributes.

In particular, the created feature vector may express embedding that represents the privileged access with respect to multiple different, and disparate aspects which are unrelated and independent from each other and may thus characterize and define the privileged access and its correlation to the user 204 with high accuracy, reliability, and/or authenticity.

Since it is constructed based in a plurality of access attributes, the feature vector may typically be a multi-dimension vector.

As shown at 106, the secure access manager 230 may retrieve, fetch, receive, and/or otherwise obtain one or more typical feature vectors created for the user 204 based on historic data collected for the user 204 collected during a plurality of previous privileged accesses conducted by the user 204 to access the secure resource 206.

Each typical feature vector may be a multi-dimension vector created, as described in step 104 of the process 100, based on a plurality of access attributes identified during the plurality of previous privileged accesses conducted by the user 204. In particular, each typical feature vector may be created based on access attributes identified during one or more previous privileged accesses which are verified to be actually conducted by the user 204. As such, the typical feature vector(s) may be unique and distinctive for the user 204 and thus highly indicative of privileged accesses made by the specific user 204.

The typical feature vector(s) may be stored in one or more storages. For example, one or more typical feature vectors may be locally stored at the client device 202, for example, in the storage 216. In another example, one or more typical feature vectors may be stored remotely, for example, in the storage 226, and/or in one or more networked storage resources accessible via the network 208, for example, a storage server, a cloud storage service, and/or the like.

As shown at 108, the secure access manager 230 may compute, in real-time (i.e., during the privileged access), an access score indicative of deviation of the feature vector created for the (current) privileged access from the typical feature vector(s).

The secure access manager 230 may apply one or more methods, techniques, algorithms, and/or models as known in the art, for computing the access score for the feature vector compared to the typical feature vector(s).

According to some embodiments, the secure access manager 230 may apply one or more trained Machine Learning (ML) models to compute the access score for feature vectors created for the privileged accesses in order to estimate whether the accesses are valid or potentially fraudulent.

The ML model, for example, a neural network, a classifier, a Support Vector Machine (SVM), and/or the like may be trained in one or more supervised, unsupervised, and/or semi-supervised training sessions to learn one or more access patterns typical to the user 204.

Specifically, the ML model(s) may be trained to learn one or more access patterns typical to privileged access conducted by the user 204 to access one or more secure resources 206. To this end, the ML model(s) may be trained using one or more training datasets comprising plurality of training feature vectors created based on a plurality of sets of access attributes each collected during a respective one of a plurality of previous privileged accesses made by the user 204 to one or more secure resources 206.

Training the ML model(s) may be done offline, i.e., before deployed to compute the access score for privileged accesses and estimate whether the accesses are valid or potentially fraudulent. Optionally the ML model(s) may be further trained online, post-deployment, optionally using feature vectors created for privileged accesses evaluated by the ML model(s).

Optionally, the ML model(s) may be configured to apply dimension reduction and dimension reconstruction to the feature vectors as known in the art, such that the multi-dimensional feature vectors may be reduced to a significantly lower dimension, processed and then reconstructed to restore their original dimension.

Moreover, the access score may be computed for each privileged access based on a reconstruction error of ML model applied to the respective feature vector created for the respective privileged access. The access score may be therefore computed for the current privileged access based on the reconstruction error identified for the feature vector created for the current privileged access.

According to some embodiments, the ML model(s) may comprise one or more autoencoder which, as known in the art, are highly efficient for detecting anomaly events deviating from typical learned patterns of the events. The autoencoder(s) which may be implemented using one or more Convolutional Neural Networks (CNN) may typically comprises one or more hidden layers, for example, convolution layers, LSTM layers, and/or the like adapted to apply dimension reduction and reconstruction to feature vectors reflecting privileged accesses. In such deployments, the secure access manager 230 may compute the access score based on a reconstruction error computed for the feature vector created for the (current) privileged access. During training, the autoencoder may learn to minimize the reconstruction error between the input and the output data. Once trained on the normal patterns of privileged accesses conducted by the user 204, the autoencoder may be deployed and used to detect anomalous privileged accesses conducted by malicious party(s) impersonating as the user 204.

The training dataset(s) used for training the ML model(s) may be split to several subsets, for example, train samples, validation samples, and optionally test samples. The train samples which, as known in the art, typically include the majority of the training samples (feature vectors) is used to train the ML model(s) while the validation samples (feature vectors) may be used to evaluate, and validate performance of the ML model(s) after trained with the training samples.

The ML model(s) may apply a certain threshold to predict, estimate and/or determine whether a respective feature reflects a valid privileged access conducted by a legitimate, and/or authentic user 204 who is authorized to access the secure resource 206 or whether the respective feature reflects a potential fraudulent privileged accesses possibly imitated by a malicious party impersonating as the user 204 in attempt to compromise the secure resource 206.

As known in the art, the certain threshold may be computed, set, and/or defined during training of the ML model(s) using the validation subset, i.e., the samples (feature vectors) included in the validation subset.

The access score computed for each feature vector, whether it is a training sample during training or a feature vector created post deployment for an actual privileged access, may be compared to the certain threshold. In case the access score exceeds the threshold, the respective feature vector may be estimated to express a potential fraudulent privileged access and in case the access score does not exceed the threshold, the respective feature vector may be estimated to express a valid privileged access. The certain threshold may be therefore indicative of potential fraudulent privileged accesses.

Optionally, the certain threshold may be adjusted, set, and/or defined to reduce false positive detection of privileged accesses conducted by one or more fraudulent parties emulating privileged accesses by legitimate, valid and/or authorized uses 204. In other words, the threshold may be adjusted to reduce and possibly prevent classifying fraudulent privileged accesses as legitimate privileged accesses.

As shown at 110, which is a conditional step, the secure access manager 230 may compare the access score computed for the feature vector to the certain threshold indicative of potential fraudulent privileged accesses.

As shown at 112, since the access score exceeds the certain threshold, the secure access manager 230 may determine, estimate, and/or predict that the privileged access is an anomaly compared to typical privileged accesses made by the user 204 and therefore may potentially be fraudulent.

This means that responsive to the access score exceeding the certain threshold, the secure access manager 230 estimates with high probability that the privileged access is a fraudulent access initiated buy a malicious party impersonating as the user 204 in attempt to compromise the accessed secure resource 206.

For example, assuming the user 204 user typically logs into a certain secure service 206 from a specific geographic location using a specific client device 202. Further assuming that the (current) privileged access for logging into the certain secure service 206 is received from a different location and from a different client device 202. In such case, the secure access manager 230 may estimate and/or determine that the login attempt is anomalous and may therefore potentially be a fraudulent privileged access.

In another example, assuming the mouse movement pattern (movement parameters) identified in a current privileged access significantly deviates from the typical mouse movement pattern learned and/or identified for the user 204 and the ASN of the client device 202 used for the current privileged access deviates from an ASN distribution of appearance from different types. In such case, the secure access manager 230 may estimate and/or determine that the privileged access is anomalous and be a potential fraudulent privileged access.

As shown at 114, the secure access manager 230 may initiate one or more fraudulent access mitigation actions responsive to determining that the access score may be a potential fraudulent privileged access.

The mitigation actions may include, for example, reporting the potential fraudulent privileged access to one or more cyber security services, applications, controllers, personnel, and/or the like, for example, transmit one or more indications, messages, and/or alerts. The cyber security service(s), application(s), controller(s), and/or personnel, may be adapted to further investigate the potential fraudulent privileged access to determine and/or verify whether it is a valid access or not and grant or deny accordingly access to the secure resource 206. The secure access manager 230 may further provide information relating to the potential fraudulent privileged access to the cyber security service(s), application(s), controller(s), and/or personnel, for example, one or more access attributes and/or the like.

In another example, the mitigation actions initiated by the secure access manager 230 may comprise denying access to the secure resource 206 and blocking it for the potentially malicious party which imitated the potential fraudulent privileged access.

As shown at 116, since the access score does not exceed the certain threshold, the secure access manager 230 may determine, estimate, and/or predict that the privileged access is a valid privileged accesses In such case, the secure access manager 230 may take no further action and allow the privileged access to proceed uninterrupted. Optionally, the secure access manager 230 may transmit one or more indications, and/or messages to the cyber security service(s), application(s), controller(s), and/or personnel indicating that the current privileged access is determined to be a valid access.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms client devices and ML models are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of detecting potential fraudulent privileged user accesses, comprising:
- using at least one processor configured for:
  - collecting a plurality of access attributes identified during at least one privileged access conducted by at least one user using at least one client device, the plurality of access attributes relate to at least some of: a location of the at least one user, the at least one client device, a network environment, and interaction of the at least one user with at least one user input interface of the at least one client device;
  - creating a feature vector for the at least one privileged access based on a combination of at least some of the plurality of access attributes;
  - computing, in real-time, an access score based on a deviation of the feature vector of the at least one privileged access from a per-user typical feature vector learned for the at least one user by applying at least one trained machine learning model to a plurality of training feature vectors, each training feature vector created from access attributes collected during a respective previous privileged access of the at least one user, the access score being indicative of deviation of the feature vector from said per-user typical feature vector; and
  - initiating at least one fraudulent access mitigation action responsive to determining that the access score exceeds a certain threshold indicative of potential fraudulent privileged accesses.

2. The method of claim 1, wherein the at least one privileged access is subject to user authentication, the at least one privileged access relates to at least one member of a group comprising: a login to an account, a login to a device, a login to a secure service, a transaction, and an account creation.

3. The method of claim 1, wherein the at least one machine learning model is trained to learn at least one typical access pattern for the at least one user based on the plurality of training feature vectors.

4. The method of claim 3, wherein the at least one machine learning model is configured to apply dimension reduction and dimension reconstruction to the feature vectors.

5. The method of claim 4, wherein the access score is computed for the at least one privileged access based on a reconstruction error of the at least one machine learning model applied to the feature vector of the at least one privileged access.

6. The method of claim 1, further comprising adjusting the certain threshold to reduce false positive detection of privileged accesses potentially conducted by at least one fraudulent party emulating privileged accesses of the at least one user.

7. The method of claim 1, wherein the access attributes relating to interaction of the at least one user with the at least one user input interface comprise a plurality of movement parameters of at least one pointing device used by the at least one user during the at least one privileged access.

8. The method of claim 7, wherein the plurality of movement parameters of the at least one pointing device are expressed by at least one log-normal cumulative distribution function (CDF) indicative of at least one movement pattern of the at least one pointing device.

9. The method of claim 1, wherein the access attributes relating to interaction of the at least one user with the at least one user input interface comprise at least one stroke parameter captured for at least one keyboard device used by the at least one user during the at least one privileged access.

10. The method of claim 1, wherein the access attributes relating to interaction of the user with the at least one user input interface comprise at least one voice and/or speech attribute of the at least one user captured for at least one audio input device used by the at least one user during the at least one privileged access.

11. The method of claim 1, wherein the access attributes relating to interaction of the at least one user with the at least one user input interface comprise at least one tactile attribute of the at least one user captured for at least one tactile input device used by the at least one user during the at least one privileged access.

12. A system for detecting potential fraudulent privileged user accesses, comprising:
- a program store storing a code; and
- at least one processor coupled to the program store for executing the stored code, the code comprising:
  - code instructions to collect a plurality of access attributes identified during at least one privileged access conducted by at least one user using at least one client device, the plurality of access attributes relate to at least some of: a location of the at least one user, the at least one client device, a network environment, interaction of the at least one user with at least one user input interface of the at least one client device,
  - code instructions to create a feature vector for the at least one privileged access based on a combination of at least some of the plurality of access attributes,
  - code instructions to compute, in real-time, an access score based on a deviation of the feature vector of the at least one privileged access from a per-user typical feature vector learned for the at least one user by applying at least one trained machine learning model to a plurality of training feature vectors, each training feature vector created from access attributes collected during a respective previous privileged access of the at least one user, the access score being indicative of deviation of the feature vector from said per-user typical feature vector, and code instructions to initiate at least one fraudulent privileged access mitigation action responsive to determining that the access score exceeds a certain threshold indicative of potential fraudulent privileged accesses.

13. The system of claim 12, wherein the at least one privileged access is subject to user authentication, the at least one privileged access relates to at least one member of a group comprising: a login to an account, a login to a device, a transaction, and an account creation.

14. The system of claim 12, wherein the at least one machine learning model is trained to learn at least one typical login pattern of the at least one user based on the plurality of training feature vectors.

15. The system of claim 14, wherein the at least one machine learning model is configured to apply dimension reduction and dimension reconstruction to the feature vectors.

16. The system of claim 15, wherein the access score is computed for the at least one privileged access based on a reconstruction error of the at least one machine learning model applied to the feature vector of the at least one privileged access.

17. The system of claim 12, further comprising adjusting the certain threshold to reduce false positive detection of privileged accesses potentially conducted by at least one malicious party emulating privileged accesses of the at least one user.

18. The system of claim 12, wherein at least some of the plurality of access attributes relating to interaction of the at least one user with the at least one user input interface comprise a plurality of movement parameters of at least one pointing device used by the at least one user during the at least one privileged access.

19. The system of claim 18, wherein the plurality of movement parameters of the at least one pointing device are expressed by at least one log-normal cumulative distribution function (CDF) indicative of at least one movement pattern of the at least one pointing device.

20. The system of claim 12, wherein the access attributes relating to interaction of the at least one user with the at least one user input interface comprise at least one of:

at least one stroke parameter captured for at least one keyboard device used by the at least one user during the at least one privileged access, at least one voice and/or speech attribute of the at least one user captured for at least one audio input device used by the at least one user during the at least one privileged access, and at least one tactile attribute of the at least one user captured for at least one tactile input device used by the at least one user during the at least one privileged access.

* * * * *